(12) United States Patent
Takahashi et al.

(10) Patent No.: US 9,264,593 B2
(45) Date of Patent: Feb. 16, 2016

(54) IMAGE-PICKUP APPARATUS

(71) Applicant: CANON KABUSHIKI KAISHA, Tokyo (JP)

(72) Inventors: Tomoki Takahashi, Kamagaya (JP); Miyabi Miyagawa, Tokyo (JP); Takeshi Kikkawa, Yokohama (JP); Hiroaki Ohashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/136,500

(22) Filed: Dec. 20, 2013

(65) Prior Publication Data

US 2014/0184903 A1    Jul. 3, 2014

(30) Foreign Application Priority Data

Dec. 27, 2012    (JP) .................... 2012-285996

(51) Int. Cl.
*H04N 5/225* (2006.01)
*H04N 1/00* (2006.01)

(52) U.S. Cl.
CPC ......... *H04N 5/2254* (2013.01); *H04N 1/00384* (2013.01); *H04N 5/2251* (2013.01); *H04N 1/00519* (2013.01)

(58) Field of Classification Search
None
See application file for complete search history.

(56) References Cited

U.S. PATENT DOCUMENTS

| | | | | |
|---|---|---|---|---|
| 5,148,199 A | * | 9/1992 | Kohmoto et al. | 396/86 |
| 5,155,515 A | * | 10/1992 | Kohmoto et al. | 396/76 |
| 5,664,243 A | * | 9/1997 | Okada et al. | 396/246 |
| 5,752,117 A | * | 5/1998 | Hori | 396/504 |
| 6,215,958 B1 | | 4/2001 | Ichino et al. | |
| 6,400,902 B1 | * | 6/2002 | Usui | 396/55 |
| 2002/0015593 A1 | * | 2/2002 | Kai | G03B 17/02 396/419 |
| 2007/0229672 A1 | * | 10/2007 | Kaneda | 348/218.1 |
| 2010/0208122 A1 | * | 8/2010 | Yumiki | 348/333.08 |
| 2012/0207354 A1 | * | 8/2012 | Kubota | 382/103 |

FOREIGN PATENT DOCUMENTS

| | | |
|---|---|---|
| JP | 2001-318421 A | 11/2001 |
| JP | 2004-053700 A | 2/2004 |
| JP | 2007-194952 A | 8/2007 |
| TW | M360382 | 7/2009 |

OTHER PUBLICATIONS

The above patent documents were cited in a Apr. 24, 2015 Taiwanese Office Action, which is enclosed with an English Translation, that issued in Taiwanese Patent Application No. 102147509.

* cited by examiner

*Primary Examiner* — Twyler Haskins
*Assistant Examiner* — Wesley J Chiu
(74) *Attorney, Agent, or Firm* — Cowan, Liebowitz & Latman, P.C.

(57) ABSTRACT

An image pickup apparatus capable of performing zooming and release operation easily whether the photographer operates with right-handed or left-handed without being lack of design. The image pickup apparatus includes a lens unit, a first ring operation unit that is ring shaped and arranged around the lens unit, a base unit configured to hold the first ring operation unit so that the first ring operation unit is capable of sliding in a first direction and a second direction perpendicular to an optical axis of the lens unit, and a first detector configured to detect a slide of the first ring operation unit in the first direction or the second direction. The first direction and the second direction are opposite to each other.

23 Claims, 15 Drawing Sheets

IMAGE-PICKUP APPARATUS

BACKGROUND OF THE INVENTION

1. Field of the Invention

The present invention relates to an image pickup apparatus, for example, such as a digital camera.

2. Description of the Related Art

In recent years, digital cameras are familiarized and various designs thereof are proposed. In most cameras, a button layout assumed a right-handed photographer is carried out. When a camera is grasped with a right hand, a release button (a shutter button) is arranged in a position where operating by a right index finger is easy.

However, these cameras are hard to use for a left-handed photographer. Therefore, in Japanese Patent Laid-Open No. 2004-53700 and Japanese Patent Laid-Open No. 2001-318421, two release buttons are arranged on an upper surface of the camera and a release button is arranged on each of an upper surface and a bottom surface of the camera. As a result, the photographer is capable of grasping and of operating with a dominant hand whether the photographer is right-handed or left-handed.

However, in Japanese Patent Laid-Open No. 2004-53700 and Japanese Patent Laid-Open No. 2001-318421, there are problems that it is hard to operate since a plurality of release buttons are arranged, and additionally, a release button is unintentionally push with a hand which is not a dominant hand when the camera is grasped with both hands.

Although the electric exclusive control of a button which gives a plurality of the same instructions is devised, an operation may become unclear and there is the threat of missing a photo opportunity.

In terms of design, when a plurality of release buttons are arranged in a digital camera, concavo-convex portions increase on an exterior of the digital camera. As a result, there is a problem of lacking design since unity of an exterior of the digital camera becomes worse.

SUMMARY OF THE INVENTION

The present invention provides an image pickup apparatus capable of performing zooming and release operation easily whether the photographer operates with right-handed or left-handed without being lack of design.

An image pickup apparatus as one aspect of the present invention includes a lens unit, a first ring operation unit that is ring shaped and arranged around the lens unit, a base unit configured to hold the first ring operation unit so that the first ring operation unit is capable of sliding in a first direction and a second direction perpendicular to an optical axis of the lens unit and a first detector configured to detect a slide of the first ring operation unit in the first direction or the second direction. The first direction is opposed to the second direction.

Further features of the present invention will become apparent from the following description of exemplary embodiments (with reference to the attached drawings).

DESCRIPTION OF THE PREFERRED EMBODIMENTS

Exemplary embodiments of the present invention will be described below with reference to the accompanied drawings.

Embodiment 1

Figure 1A:
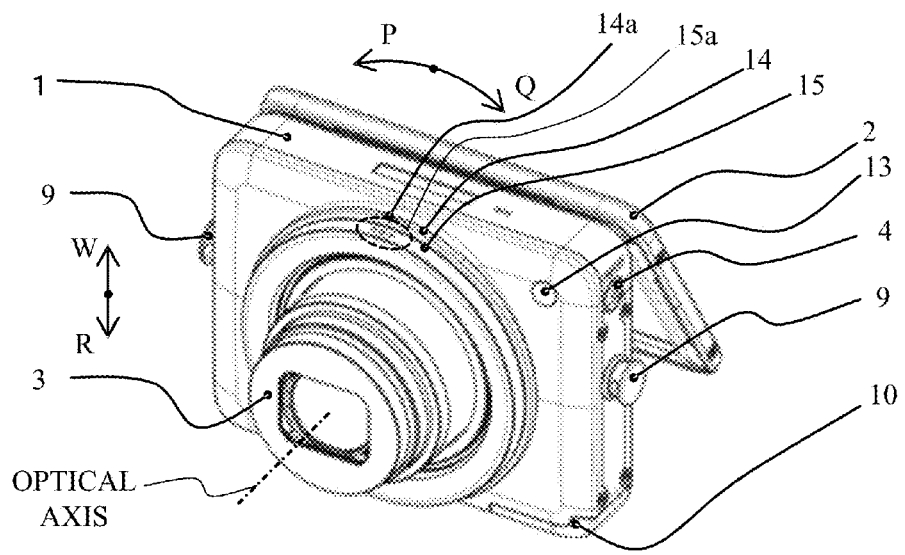
FIGS. 1A to 1C are appearance perspective views of a digital camera relating a first embodiment of the present invention.
Figure 1B:
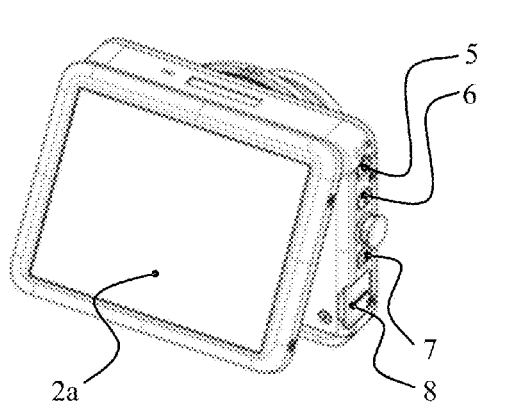
Figure 1C:
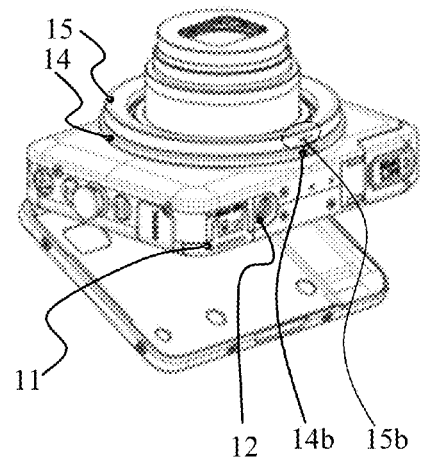

FIGS. 1A to 1C are appearance perspective views of a digital camera (hereinafter referred to as "a camera") relating a first embodiment of the present invention.

FIG. 1A is an appearance perspective view of a front side (an object side) of the camera, FIG. 1B is an appearance perspective view of a back side (a photographer side) of the camera, and FIG. 1C is a perspective view illustrating a front side, a left side and a bottom of the camera.

A state of FIGS. 1A to 1C is that a power supply is on and a lens unit 3 is extended. When the power supply is turned off, the lens unit 3 is retracted and housed until a position not protruding from a camera body (an apparatus body) 1.

A display unit (a movable unit) 2 is supported by a hinge mechanism so as to rotate relative to the camera body 1 in a predetermined angle range and is electrically coupled to the camera body 1 through a flexible wiring substrate (not shown). FIGS. 1A to 1C illustrate states where the display unit 2 opens at an angle of about 30 degrees relative to the camera body 1.

The display 2a uses a liquid crystal panel unit, for example and displays an EVF (an electronic view finder) image when shooting and a regeneration image. An electrostatic capacity type touch panel is assembled in the display 2a and various operations such as settings of photographing, regeneration of recorded image, a magnification/a reduction/a scroll of an image/an edit of an image and communication settings are performable by touching a screen with a finger. The display 2a is also capable of displaying photographing conditions such as a shutter speed and an aperture, a number of photographing, and a menu.

The lens unit 3 includes an image pickup optical system, a lens barrier, a photoelectric conversion element, a lens driving mechanism, a stop, and a shutter. The lens unit 3 forms an object image on an image pickup element by the image pickup optical system. A power button 4 is an operation unit that turns on/off the power of the camera.

A mode switching lever 5 is an operation unit that switches photographing modes (for example, a still image mode, a video mode, a single and continuous shoot mode and scene switching mode). A communication button 6 is an operation unit that starts a wireless communication such as a Wi-Fi. A regeneration button 7 is an operation unit that transits from a photographing mode to a regeneration mode and displays recorded still image and video to the display 2a if the regeneration button 7 is pushed. Additionally, if the regeneration button 7 is pushed from the power-off state, the camera is started in the regeneration mode. A terminal cover 8 is supported so as to slide and rotate relative to the camera body 1. If the terminal cover 8 is opened, an external connection terminal such as a USB terminal and HDMI terminal is exposed.

A strap base 9 is a strap base for passing a strap string (not shown) and is arranged at a left side and a right side. A battery cover 10 is hold so as to slide and rotate relative to the camera body 1. If the battery cover 10 is opened, a battery is inserted and extracted. A card cover 11 is held so as to slide and rotate relative to the camera body 1. If the card cover 11 is opened, a record medium is inserted and extracted. A tripod socket 12 is used when the camera is fixed to a tripod for photographing.

An illumination window 13 is made from a transparent member, introduces and diffused a light of a light emitting element arranged inside of the camera. This illumination emits light when operating a low illumination photographing (a still image photographing and a video photographing) and a low illumination AF (autofocus).

A zoom ring (a second ring operation member) 14 is a ring-shaped and is arranged around the lens unit 3. The zoom ring 14 rotates in a "P" direction and a "Q" direction (illustrated in FIG. 1A) within a predetermined angle range around an optical axis of the lens unit 3 relative to the camera body 1.

If the zoom ring 14 rotates in the "P" direction, the lens unit 3 moves to a TELE side. If the zoom ring 14 rotates in the "Q" direction, the lens unit 3 moves to the WIDE side. The photographer operates the zoom ring 14 to rotate and afterwards, the zoom ring 14 returns to a neutral position by a spring (not shown) when the photographer takes the finger off.

A concavo-convex shape portion is respectively shaped on a top side operation portion 14a and a bottom side operation portion 14b of the zoom ring 14 so as to be good finger-hooking.

A release ring (a first ring operation member) 15 is a ring-shaped and is arranged around the lens unit 3. An outside diameter of the release ring 15 is formed so as to be smaller than that of the zoom ring 14 and is arranged so as to protrude forward of the camera compared to the zoom ring 14. The release ring 15 slides in a "R" direction and a "W" direction (illustrated in FIG. 1A) perpendicular to the optical axis of the lens unit 3 within a predetermined range relative to the camera body 1.

Release operation of the camera so as to shoot a still image is operated by pushing the release ring 15 down i.e., operating the release ring 15 in the "R" direction (illustrated in FIG. 1A). Similarly, release operation of the camera so as to shoot a still image is operated by pushing the release ring 15 up i.e., operating the release ring 15 in the "W" direction (illustrated in FIG. 1A).

Generally, the release button of the camera is two-step switch. When a first-stage switch (SW1) is on by pressing the release button halfway, an autofocus (an AF) and an auto exposure (an AE) are performed. When a second-stage switch (SW2) is on by pressing the release button fully, still image photographing is performed. The release ring 15 is also two-step switch. The release ring 15 is restricted from moving and moves only within a predetermined range.

Additionally, the release ring 15 returns a neutral position by a spring (not shown) when the finger is left after finishing pushing down operation or pushing up operation.

A concavo-convex shape portion is respectively shaped on a top side operation portion 15a and a bottom side operation portion 15b of the release ring 15 as an index of a region for operating.

A state of FIGS. 1A to 10 is that the zoom ring 14 and the release ring 15 are positioned at each neutral position.

Figure 2A:
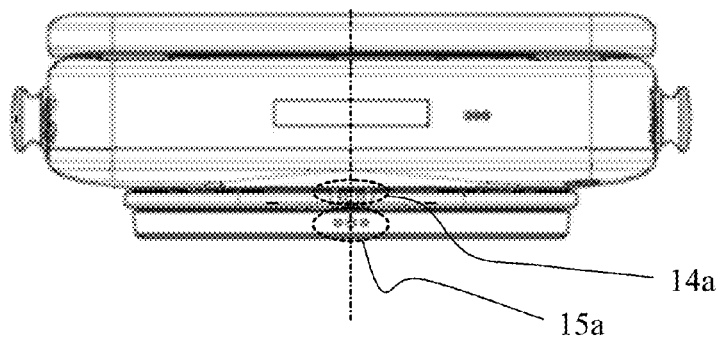
FIGS. 2A to 2C are appearance views of the digital camera.
Figure 2B:
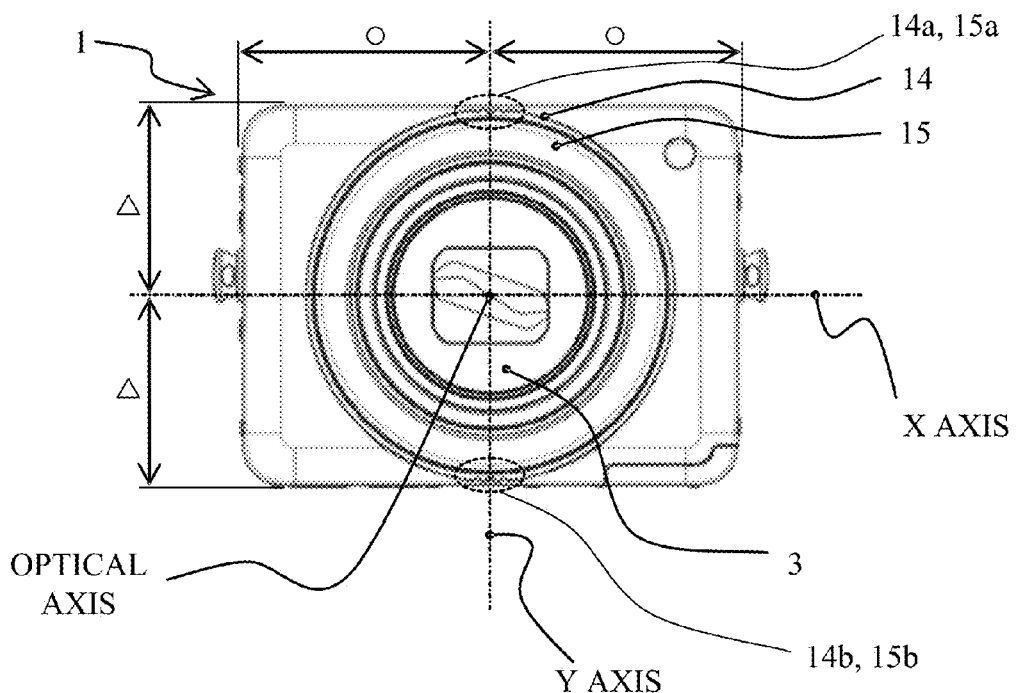
Figure 2C:
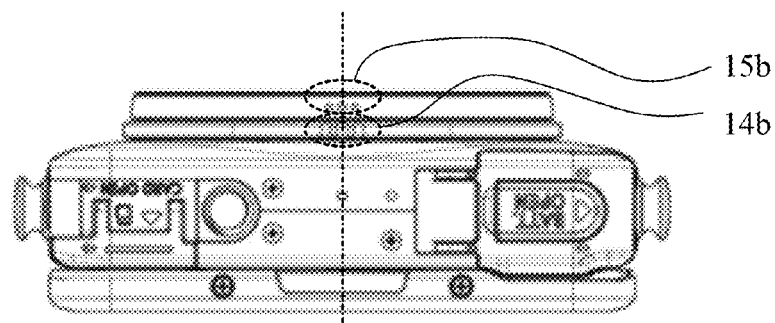

Next, the arrangement relation relative to the camera body 1 of the zoom ring 14 and the release ring 15 is explained by using FIGS. 2A to 2C.

FIG. 2A is a top view of the camera, FIG. 2B is a front view of the camera and FIG. 2C is a bottom view of the camera. Each figure illustrates a collapsed state in a power-off state.

An outer shape of the camera body 1 is an approximately cuboid shape, is a vertically symmetrical shape in a lateral direction (a X-axis direction), and a horizontally symmetrical shape in a longitudinal direction (a Y-axis direction) centered on the optical axis of the lens unit 3.

The zoom ring 14 and the release ring 15 are arranged so as to surround a periphery of the lens unit 3. Then, a distance from the left side of the camera to the top side operation portion 14a of the zoom ring 14 is equal to a distance from the left side of the camera to the bottom side operation portion 14b of the zoom ring 14. A distance from the right side of the camera to the top side operation portion 14a of the zoom ring 14 is equal to a distance from the right side of the camera to the bottom side operation portion 14b of the zoom ring 14. Similarly, a distance from the left side of the camera to the top side operation portion 15a of the release ring 15 is equal to a distance from the left side of the camera to the bottom side operation portion 15b of the release ring 15. A distance from the right side of the camera to the top side operation portion 15a of the release ring 15 is equal to a distance from the right side of the camera to the bottom side operation portion 15b of the release ring 15. Additionally, a distance from the upper side of the camera to the top side operation portion 14a is equal to a distance from the bottom side of the camera to the bottom side operation portion 14b. A distance from the upper side of the camera to the top side operation portion 15a is equal to a distance from the bottom side of the camera to the bottom side operation portion 15b. Further, a center axis of both the zoom ring 14 and the release ring 15 overlaps with a center of the optical axis of the lens unit 3. Since a vertical and a horizontal center of the camera body 1 overlap with the center of the optical axis of the lens unit 3 in the camera of this embodiment, the center axis of both the zoom ring 14 and the release ring 15 overlaps with a vertical and a horizontal center of the camera body 1. A photographer performs zooming and release operation with a right hand or a left hand as the same sense by arrangement of the zoom ring 14 and the release ring 15.

Moreover, in this embodiment, each distance from a top surface of the camera to each operation portion 14a, 14b of the zoom ring 14 is equal to each distance from a bottom surface of the camera to each operation portion 14a, 14b of the zoom ring 14. And, each distance from a top surface of the camera to each operation portion 15a, 15b of the release ring 15 is equal to each distance from a bottom surface of the camera to each operation portion 15a, 15b of the release ring 15. Therefore, zooming and release operation is performable if the camera is inverted (upside down), and photographing at various angles is easy to operate.

FIGS. 3A to 3E are figures illustrating an operator that holds a camera.

Figure 3A:
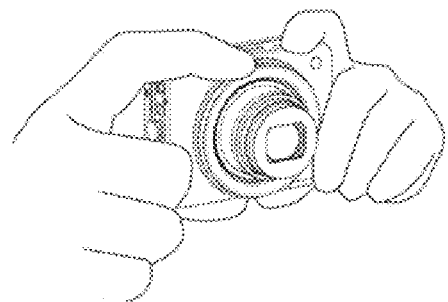
FIGS. 3A to 3E are figures illustrating an operator that holds a camera.

FIG. 3A is a state that the top side operation portions of the zoom ring 14 and the release ring 15 are operated by a right first finger and this state is suitable for a normal photographing by a right-handed photographer.

Figure 3B:
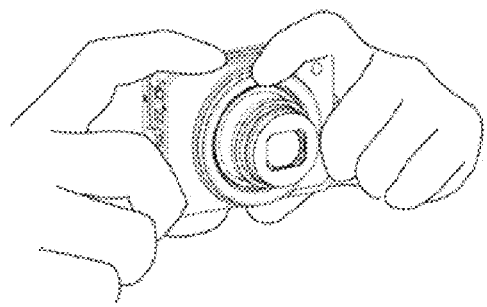

FIG. 3B is a state that the top side operation portions of the zoom ring 14 and the release ring 15 are operated by a left first finger and this state is suitable for a normal photographing by a left-handed photographer.

Figure 3C:
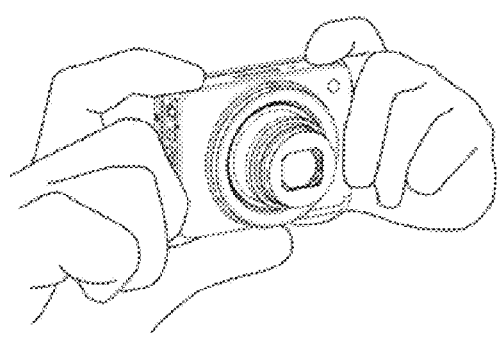

FIG. 3C is a state that the bottom side operation portions of the zoom ring 14 and the release ring 15 are operated by a right thumb and, for example, this state is suitable for macro photographing.

Figure 3D:
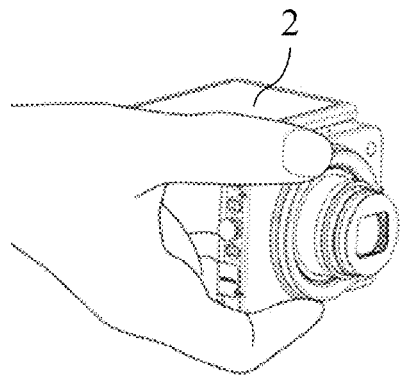

FIG. 3D is a state that the display unit 2 is opened and the top side operation portions of the zoom ring 14 and the release ring 15 are operated by a right thumb, and this state is suitable for low angle photographing.

Figure 3E:
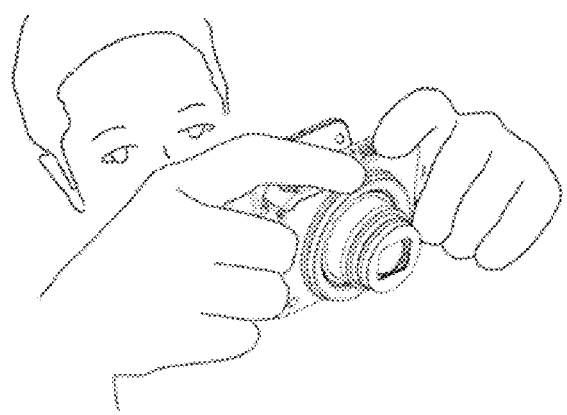

FIG. 3E is a state that the display unit 2 is opened and the top side operation portions of the zoom ring 14 and the release ring 15 are operated by a right first finger when the camera is inverted, and this state is suitable for high angle photographing.

Even if the camera is grasped by various ways to hold, relaxed and natural zooming and release operation are performable. When the front of the camera is directed to self i.e., self photographing is performed, relaxed and natural zooming and release operation are performable.

Next, the configurations of the zoom ring 14 and the release ring 15 are explained in detail.

Figure 4A:
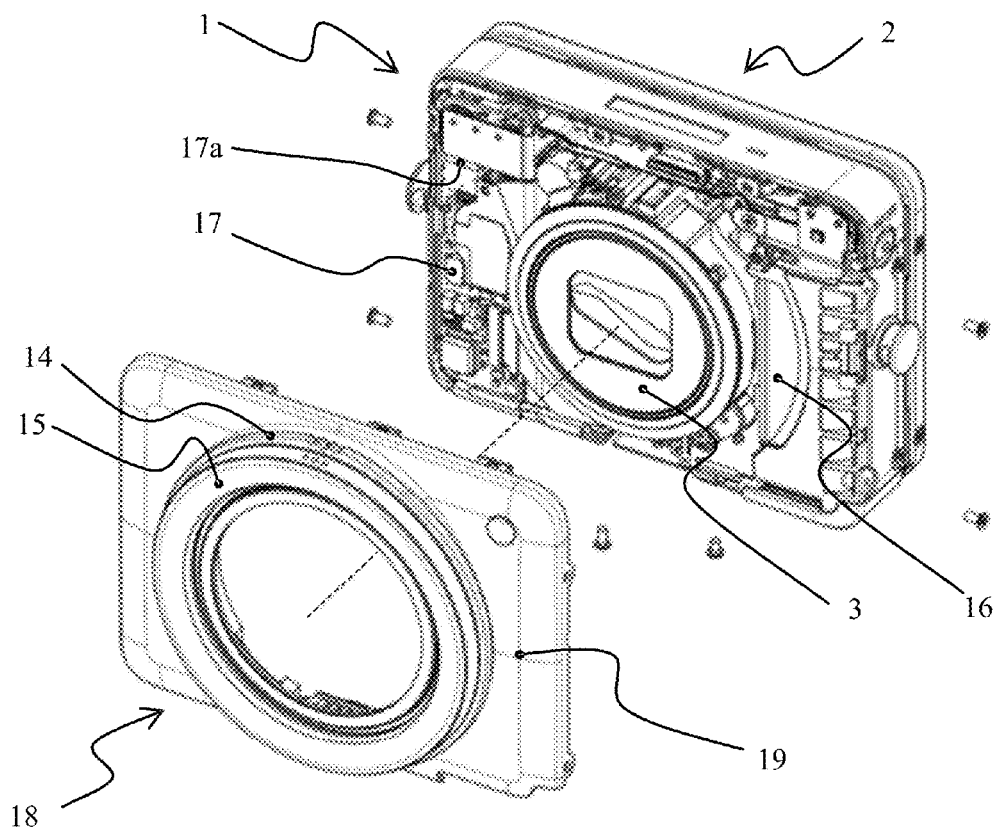
FIGS. 4A and 4B are partial development perspective views seen from a front side of the digital camera.
Figure 4B:
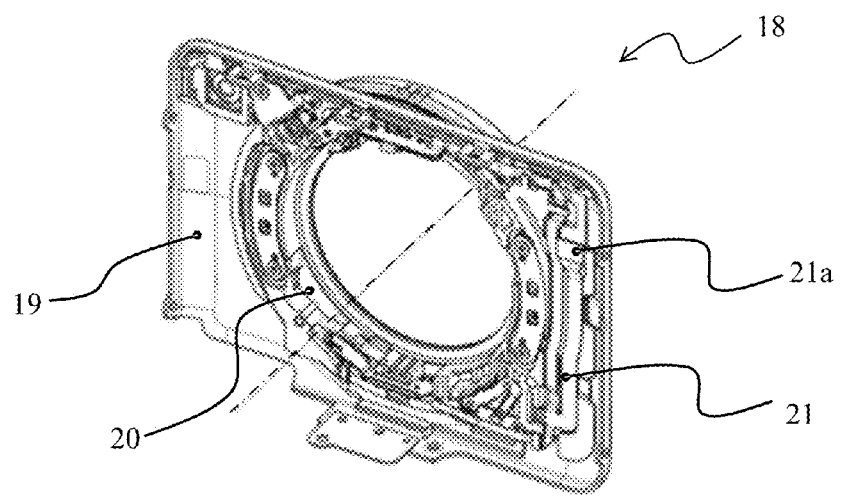

FIGS. 4A and 4B are partial development perspective views seen from a front side of the digital camera. FIG. 4A is a state that a front cover unit 18 is removed and FIG. 4B is a perspective view of the front cover unit 18 seen from a back side thereof.

A battery 16 supplying the camera with power is arranged in a right side of the lens unit 3 of the camera body 1 and a main circuit substrate 17 mounting electronic components such as a main CPU is arranged in a left side of the lens unit 3 of the camera body. The main circuit substrate 17, the display unit 2, the lens unit 3 and the battery 16 are coupled by a flexible wiring board (not shown). A connector 17a for coupling with the flexible wiring board which is attached to the front cover unit 18 is mounted to the main circuit substrate 17.

The main configuration of the front cover unit 18 are a front cover 19, a front inner 20, a front flexible wiring board 21, the zoom ring 14 and the release ring 15.

The front cover 19 is formed by press drawing a metal material. An opening is formed at the center of the front cover 19. The front inner 20 made of resin fits in the opening of the front cover 19 and is adhesively fixed to the front cover 19. An opening is formed at the center of the front inner 20. When the front cover unit 18 is attached to the camera body 1, a part of the lens unit 3 is positioned inside of the opening of the front inner 20. When the power supply of the camera body 1 is turned on, a part of the lens unit 3 is extended from the opening of the front inner 20.

The front inner 20 is a base unit holding the zoom ring 14 and the release ring 15. The zoom ring 14 rotates in a predetermined range relative to the front inner 20. The release ring 15 is attached so as to interpose the zoom ring 14 and slide in a predetermined range relative to the front inner 20. The front flexible wiring board 21 mounting a switch receiving an execution of release operation and zooming is attached to the front inner 20.

A contact connector 21a exposing a part of patterns is provided on the top of the front flexible wiring board 21 and is connected to a connector 17a of the main circuit substrate 17. This connection transmits a signal output by operations of the zoom ring 14 and the release ring 15 to the main CPU. The main CPU receives the signal and issues an instruction for operating the lens unit 3.

Figure 5A:
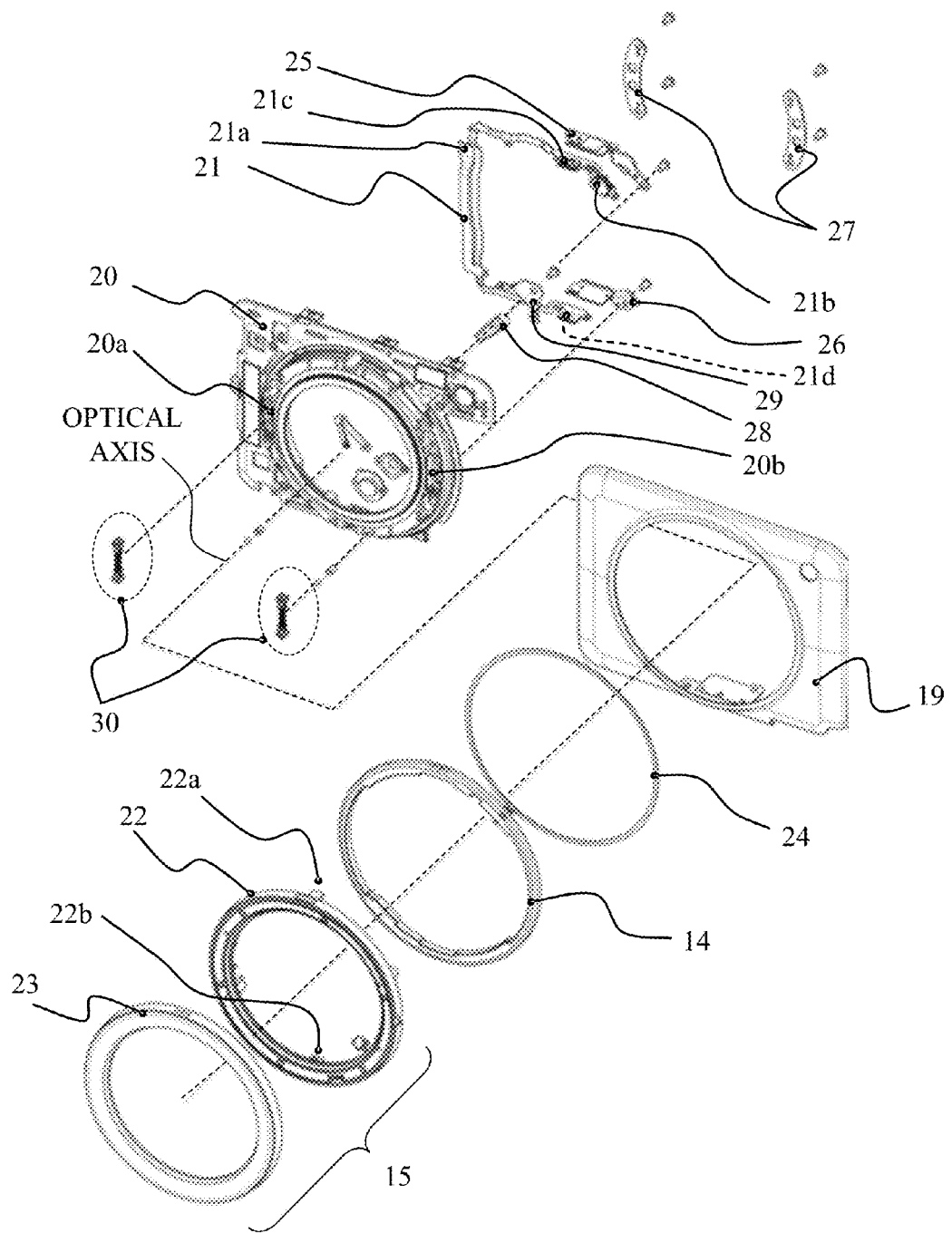
FIGS. 5A and 5B are development perspective views seen from a front direction of a front cover unit of the digital camera.
Figure 5B:
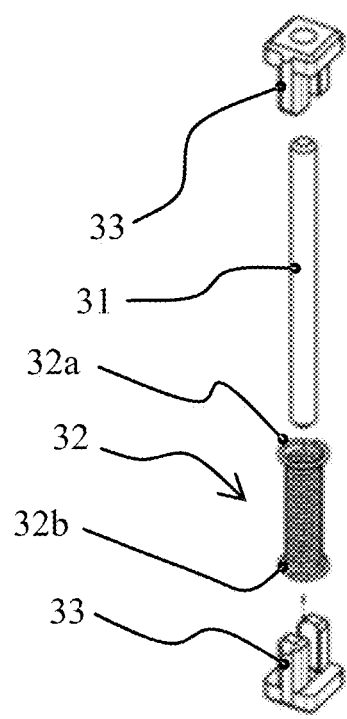
Figure 6:
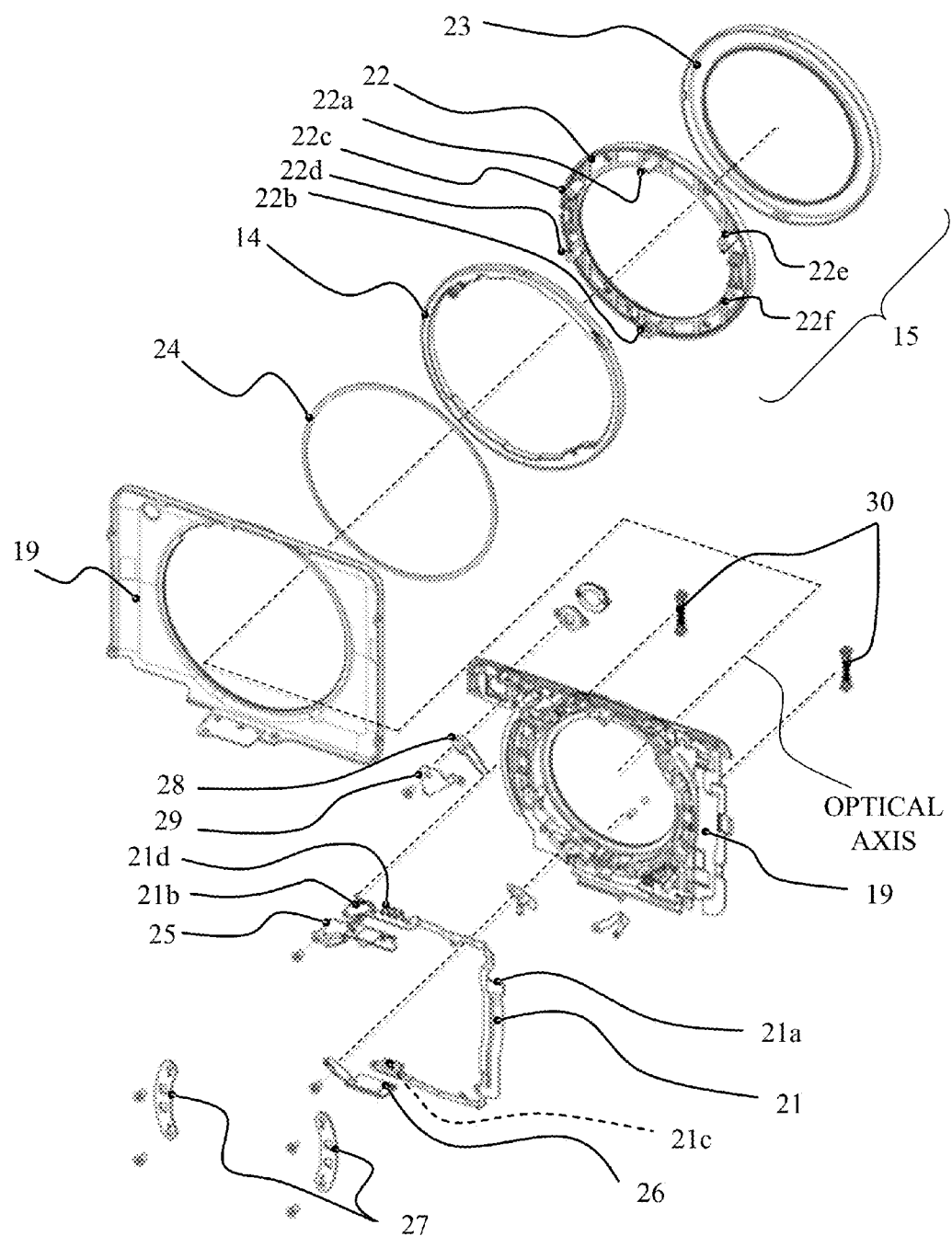
FIG. 6 is a development perspective view seen from a backward direction of the front cover unit of the digital camera.

Next, the detailed construction of the front cover unit 18 is explained by using FIGS. 5A, 5B, and 6.

FIG. 5A is a development perspective view seen from the front direction of the camera of the front cover unit 18 and FIG. 5B is a partially expanded view of components. FIG. 6 is a development perspective view seen from the back direction of the camera of the front cover unit 18.

In terms of manufacturing, design and strength, the release ring 15 is comprised by bonding a release base 22 made of a synthetic resin material and a release cap 23 made of a metal material. Pushing portions 22a and 22b pressing a release switch described later are formed on the release base 22.

A sliding sheet 24 is stuck to the zoom ring 14 and improves a slide of rotation operation.

Subsequently, various components attached to the front inner 20 are explained.

A detection switch detecting rotation operation of the zoom ring 14 and a detection switch detecting slide operation of the release ring 15 are mounted on the front flexible wiring board 21.

A zoom switch (a second detector) 21b whose tiltable portion is tiltable in two directions is used as the detection switch detecting rotation operation of the zoom ring 14 i.e., detecting rotation in a TELE direction and a WIDE direction of the zoom ring 14. Two release switches (a first detector) 21c and 21d which are metal dome type are used as the detection switches detecting slide operation. The release switch 21c detects a pushing down operation of the release ring 15 and the release switch 21d detects a pushing up operation of the release ring 15.

The output signal output from a zoom switch is transmitted to the contact connector 21a through a pattern of the front flexible wiring board 21.

The release switches 21c and 21d are two-step switch detects SW1 (a first-stage switch) and SW2 (a second-stage switch). Output signals of SW1 and SW2 respectively output from the release switches 21c and 21d merge in the front flexible wiring board 21 and is drawn out to the contact connector 21a in the state where the number of signal lines is small. In other words, the main CPU cannot determine whether the release switch 21c is operated or the release switch 21d is operated. However, in this embodiment, since the release switches 21c and 21d turns on at the same time, there are no problems in particular. Since a port of the CPU is cut by merging output signals from the switch on the way and deleting the number of the signals, the cost of the CPU is reduced and, further manufacturing cost of the camera becomes low.

Pressing members 25 and 26 fix the front flexible wiring board 21 to the front inner 20. After attaching the front flexible wiring board 21 to the front inner 20 by using a positioning tool (not shown), the pressing members 25 and 26 are covered with the front flexible wiring board 21 and fixed to the front inner 20 by screws.

A release plate 27 made of a metal material is a locking member of the release base 22. In this embodiment, two same components are attached horizontally so as to hold the optical axis of the lens unit 3. Screw bosses 22c, 22d, 22e and 22f are formed on the release base 22. The release plate 27 is fixed to the release base 22 by screws so as to hold the front inner 20.

A torsion spring (a second urging member) 28 is an urging member which returns the zoom ring 14 to the neutral position. A spring pressing member 29 is a member which prevents the torsion spring 28 from falling out. An end turn part of the torsion spring 28 is inserted in a boss of the front inner 20, the torsion spring 28 is covered with the spring pressing member 29, and the spring pressing member 29 is fixed to the boss of the front inner 20 by screws. An arm portion of the torsion spring 28 is hooked to spring hook portions of the front inner 20 and the zoom ring 14.

Two spring units 30 return the release ring 15 to the neutral position and are arranged one by one on each side of the front inner 20 so as to hold the optical axis. The spring units 30 includes a metal shaft 31, a coil spring (a first urging member) 32 and two retainers 33 which are made from resin and restrict the coil spring 32. The retainers are used one by one at the upper and lower sides of the coil spring 32. The coil spring 32 is an urging means so as to return the release ring 15 to the neutral position.

The spring units 30 are respectively inserted into concave portions for spring store 20a and 20b of the front inner 20 in a state that the metal shaft 31 is inserted into the coil spring 32, the retainers 33 are inserted from the upper and lower sides of the coil spring 32 and the coil spring is compressed. Pocket-shaped concave portions are provided on the upper and lower side of the concave portions for spring 20a and 20b of the front inner 20 so as to press-fit the metal shaft 31, and the spring unit 30 is fixed to the front inner 20 by press-fitting the metal shaft to the concave portions. The metal shaft 31 prevents the coil spring 32 from causing buckling and bowing. Additionally, internal diameters of upper side turn end portion 32a and lower side turn end portion 32b of the coil spring 32 are larger than an internal diameter at the center part of the coil spring 32. This construction prevents the coil spring 32 from falling and holding by a small space generated between the retainers 33 and the metal shaft 31 and a small space generated between corner rib portions 22g and 22h of the release base 22 and the metal shaft 31. Center part of the coil spring 32 is guided by the metal shaft 31 and a gap between an external diameter of the metal shaft 31 and an internal diameter of the center part of the coil spring 32 becomes small enough not to induce problems in the operation. By not constituting the above configuration in such a way, flapping noise (vibration noise) generates by vibration when returning the neutral position after operating the release ring 15. Further, it is preferred that the coil spring is applied with high viscosity grease so as to reduce flapping noise of the coil spring 32. The upper side turn end portion 32a and lower side turn end portion 32b of the coil spring 32 respectively engage with the corner rib portions 22g and 22h of the release base 22 so as to return the release base 22 to a neutral position.

In this embodiment, the release ring 15 is divided into two parts which are the release base 22 and the release cap 23. It is preferred that the release ring 15 is integrated by metal material or synthetic resin material.

Figure 7A:
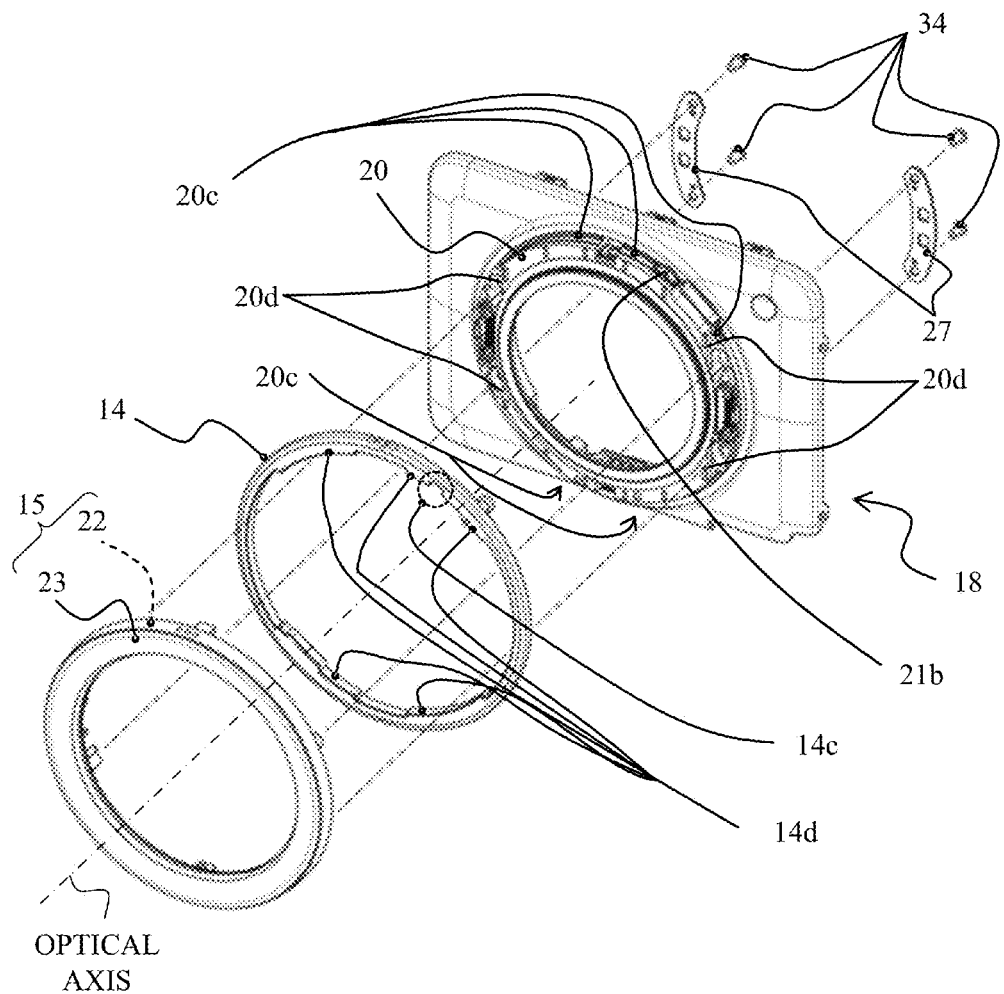
FIGS. 7A to 7C are development perspective views in the middle of an assembly of the front cover unit of the digital camera.
Figures 7B, 7C:
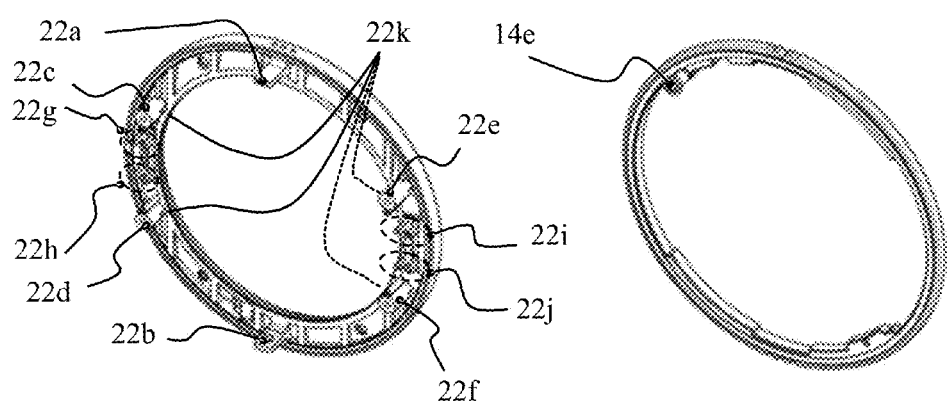

Next, attachment configuration and assembly of the zoom ring and the release ring are explained by using FIGS. 7A to 7C.

FIG. 7A is a development perspective view in the way of assembly of the front cover unit 18, FIG. 7B is a perspective view seen from the back side of the release ring 15, and FIG. 7C is a perspective view seen from the back side of the zoom ring 14.

In FIG. 7A, mounting structure of the zoom ring 14 and the release ring 15 is explained.

First, the zoom ring 14 is attached to the front cover unit 18 in a semi-finished state. A guide surface 14d which is a guide of the zoom ring 14 is formed in the inner circumference side of the zoom ring 14. On the other hand, a guide surface 20c which is a guide of the zoom ring 14 is also formed on the front inner 20. Additionally, an engaging portion 14c engaged with the tiltable portion of the zoom switch 21b is formed on the zoom ring 14.

As illustrated in FIG. 7C, a spring hook axis 14e engaged with the arm portion of the torsion spring 28 is formed on the back side of the zoom ring 14. The spring hook axis 14e is hooked to the torsion spring 28 when attaching the zoom ring 14. In this state, the zoom ring 14 is not locked in a thrust direction (the optical axis direction) relative to the front cover unit 18 in the semi-finished state. Since the guide surface 14d of the zoom ring 14 is slidably fitted in the guide surface 20c of the front inner 20 (guide surface 14d has a proper gap relation to the guide surface 20c so as to rotate), there is only slight backlash in a radial direction (in-plane direction perpendicular to the optical axis).

Next, the release ring 15 bonded the release base 22 and the release cap 23 is attached to the front cover unit 18 in the semi-finished state.

As illustrated in FIG. 7B, the pushing portions 22a, 22b, the screw bosses 22c, 22d, 22e, 22f and the corner ribs 22g, 22h, 22i, 22j which are spring hook portions of the coil spring 32 are formed so as to protrude in the back surface direction of the release base 22. The front inner 20 has the opening so that the pushing portions 22a, 22b and the screw bosses 22c, 22d, 22e, 22f passes through the front inner 20. Additionally, the tips of the corner ribs 22g, 22h, 22i, 22j are performed chamfering so as to engage with the turn end portions 32a, 32b without catching the turn end portions 32a, 32b. Moreover, guide ribs 22k are formed so as to protrude from each screw boss near the roots of the screw bosses 22c, 22d, 22e, 22f. Since the guide ribs 22k are slidably fit in two guide surfaces 20d provided on each of right and left side of the front inner 20, the release base 22 are guided so as to slide to the front inner 20.

In this state, a positioning axis provided on near the screw bosses of the release base 22 is inserted in two openings formed on each of right and left sides of release plate 27 and then, the release plate 27 is fixed to the release base 22 by a screw 34. Therefore, the release base 22 (the release ring 15) is locked in the optical axis direction. Since the release ring 15 is arranged forward the zoom ring 14, the zoom ring 14 is not detached in the optical axis direction. The front cover unit 18 is completed by the above assembly.

Figure 8:
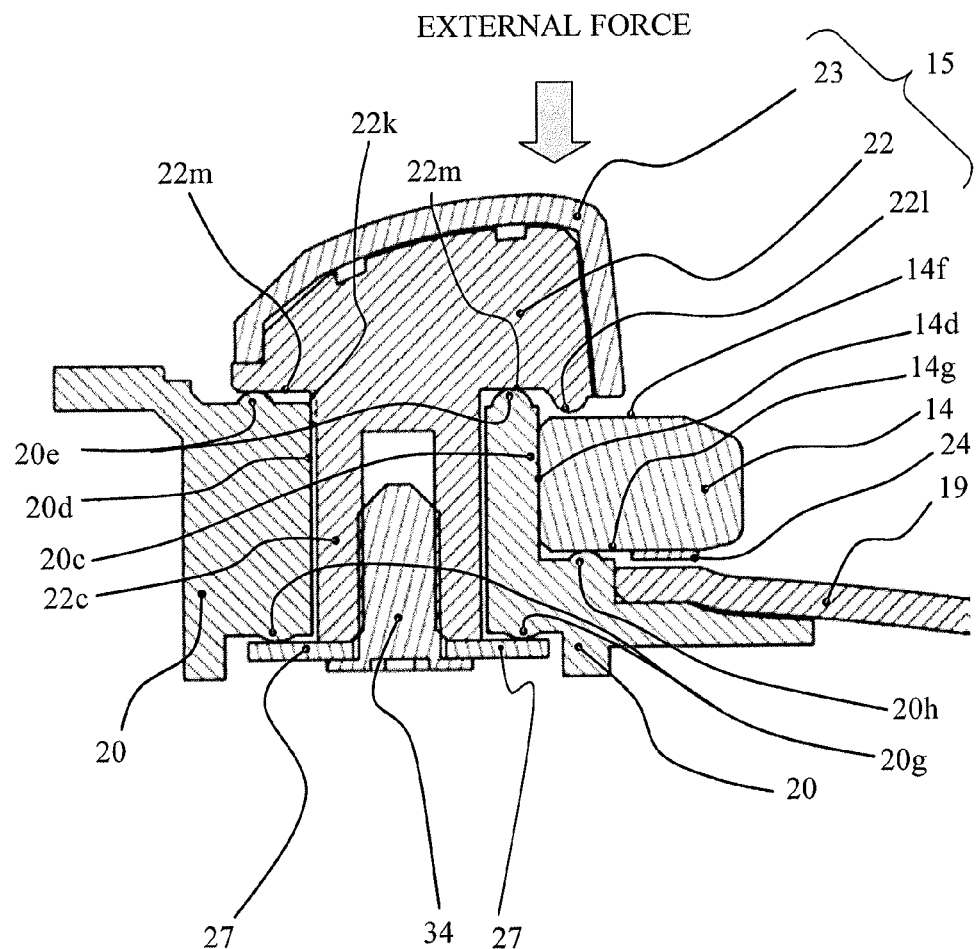
FIG. 8 is a figure illustrating sectional structures of a first ring operation member and a second ring operation member.

Next, the attachment states of the zoom ring 14 and the release ring 15 is explained by using FIG. 8.

FIG. 8 is a figure illustrating sectional structures of the zoom ring 14 and the release ring 15. This section is a schematic diagram so as to illustrate the configuration. This section illustrates only the front cover 19, the front inner 20, the zoom ring 14, the sliding sheet 24, the release ring 15 (the release base 22 and the release cap 23), the release plate 27 and the screw 34.

The release plate 27 is fixed to the release base 22 by the screw 34. Therefore, the front inner 20 is held between the release base 22 and the release plate 27. A gap between a rail surface 20e of the front inner 20 and an abutment surface 22m of the release base 22 and a gap between a rail surface 20g of the front inner 20 and the release plate 27 are not illustrated in FIG. 8, but practically a gap for not causing a problem to slide is provided.

The zoom ring 14 is held a rail surface of the release base 22 and a rail surface 20h of the front inner 20. Since a sliding surface 14f of the zoom ring 14 slides along a rail surface 22l of the release base 22 and an abutment surface 14g of the zoom ring 14 slides along a rail surface 20h of the front inner 20, the zoom ring 14 rotates.

There is a gap between the rail surface 22l of the release base 22 and the sliding surface 14f of the zoom ring 14. If there is no gap, there is a problem that a travelling space of the zoom ring 14 decreases and the zoom ring 14 does not smoothly operate when an external force from a direction of an arrow in FIG. 8 is received. For this reason, a slightly gap is provided by adding reduction amounts of a gap such as deformations of each component when each component is pressed by an external force.

Additionally, the sliding sheet 24 is stuck to the zoom ring 14. If the sliding sheet 24 is not stuck to the zoom ring 14, the zoom ring 14 contacts with the front cover 19 and as a result, a problem that the zoom ring 14 does not smoothly operate occurs. Moreover, both the zoom ring 14 and the front cover 19 are made from metal materials. Therefore, since friction resistance is big when they contact each other, abnormal noise may occur. In order to avoid these objects, the sliding sheet 24 which does not contact anywhere in normal use state is stuck to the zoom ring 14.

Figure 9A:
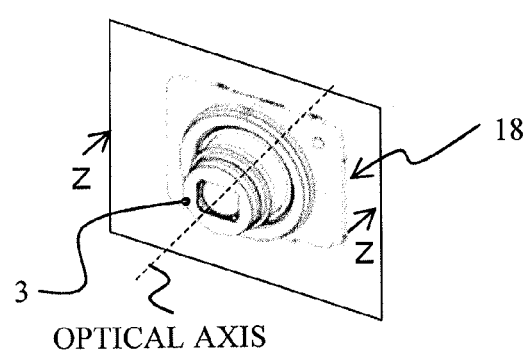
FIGS. 9A to 9C are explanatory diagrams illustrating a state where the first ring operation member of the digital camera is operated so as to rotate.
Figure 9B:
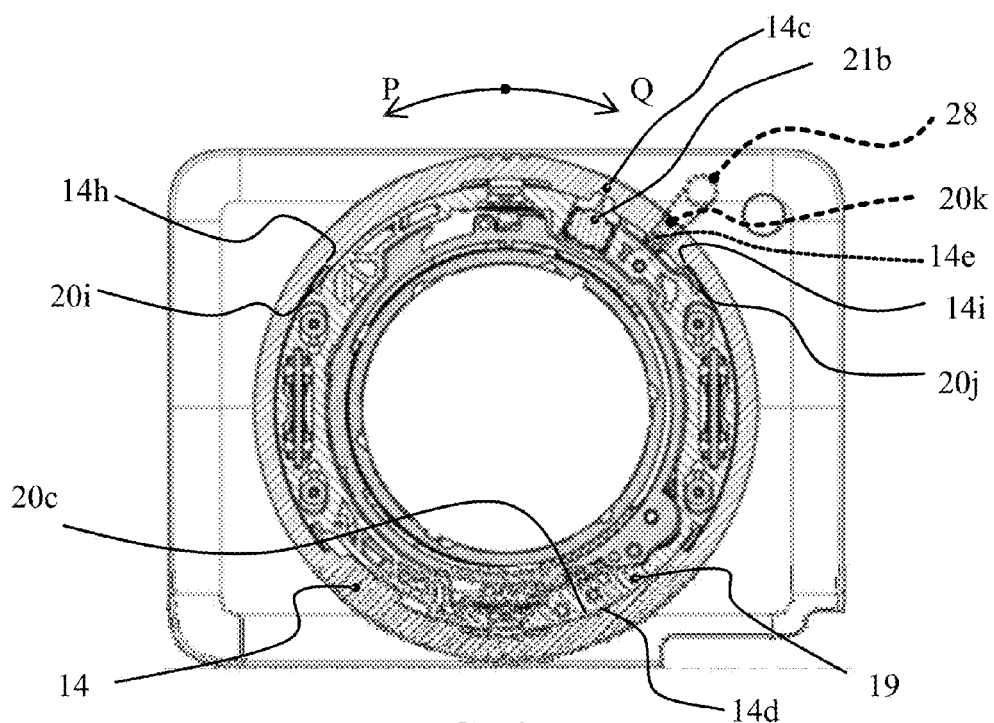
Figure 9C:
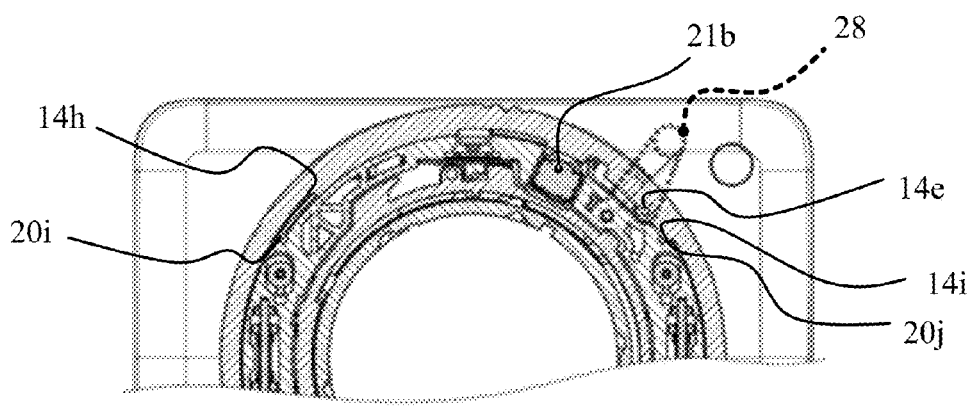

Next, the state where the zoom ring 14 rotates and the state where the zoom ring 14 is returned to the neutral position are explained by using FIGS. 9A to 9C.

FIG. 9A is a front perspective view illustrating only the lens unit 3 and the front cover unit 18. FIG. 9B is a Z-Z sectional view which is perpendicular to the optical axis of the lens unit 3 illustrated in FIG. 9A and is cut so as to pass the zoom ring 14. FIG. 9C illustrates a state where the zoom ring 14 is rotated in the "Q" direction from the state of FIG. 9B.

In the state of FIG. 9B, the arm portion of the torsion 28 is hooked to a spring hook portion 20k of the front inner 20 and the spring hook axis 14e of the zoom ring 14. Then, the zoom ring 14 is returned to a neutral position. The zoom ring 14 is rotatable in both the "P" direction (TELE) and the "Q" direction (WIDE) around the center axis of the zoom ring 14. If the zoom ring 14 is rotated, the spring hook axis 14e of the zoom ring 14 moves so as to move an arm of the torsion spring 28. Then, the torsion spring 28 is charged and urging force so as to return the neutral position occurs. In the state where the zoom ring 14 is not operated, the zoom ring 14 always returns to the neutral position. In the neutral position, since the zoom switch 21b is not kicked by the zoom lever, the output signal of the zoom switch 21b is OFF.

The state of FIG. 9C is a state where the zoom ring 14 is rotated in the "Q" direction i.e., the WIDE direction from the state of FIG. 9B. Then, a regulatory surface 20j of the front inner 20 abuts against a regulatory surface 14i of the zoom ring 14. In FIG. 9C, the zoom ring 14 abuts against a rotatable end in the "Q" direction. FIG. 9C is a state where an arm of the torsion spring 28 is deformed by the spring hook axis 14e of the zoom ring 14 and the torsion spring 28 is charged. At this time, the engagement portion 14c of the zoom ring 14 pushes down the tiltable portion of the zoom switch 21b and the zoom switch 21b outputs the signal showing WIDE. If a hand is taken off the zoom ring 14, the zoom ring 14 quickly returns to the neutral position by the urging force of the torsion spring 28.

Although not illustrated, if the zoom ring 14 rotates in the "P" direction of FIG. 9B i.e., the TELE direction, a regulatory surface 20i abuts against a regulatory surface 14h. Then, the zoom ring 14 abuts against a rotatable end in the "P" direction. The engagement portion 14c of the zoom ring 14 pushes down the tiltable portion of the zoom switch 21b and the zoom switch 21b outputs the signal showing TELE. If a hand is taken off the zoom ring 14, the zoom ring 14 quickly returns to the neutral position by the urging force of the torsion spring 28.

The zoom ring 14 rotates in a predetermined range relative to the front inner 20 and returns to the neutral position by the urging force of the torsion spring 28. And the zoom switch 21b is detectable which direction the zoom ring 14 rotates.

Next, the state where the release ring 15 is operated to slide is explained by using FIGS. 10A to 10D.

Figure 10A:
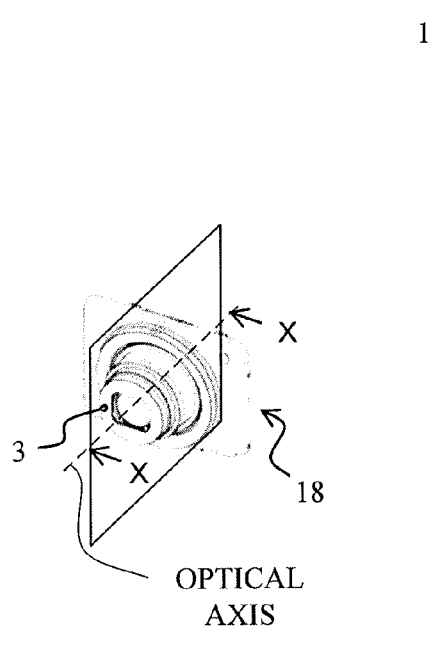
FIGS. 10A to 10D are explanatory diagrams illustrating a state where the second ring operation member of the digital camera is operated so as to slide.
Figure 10B:
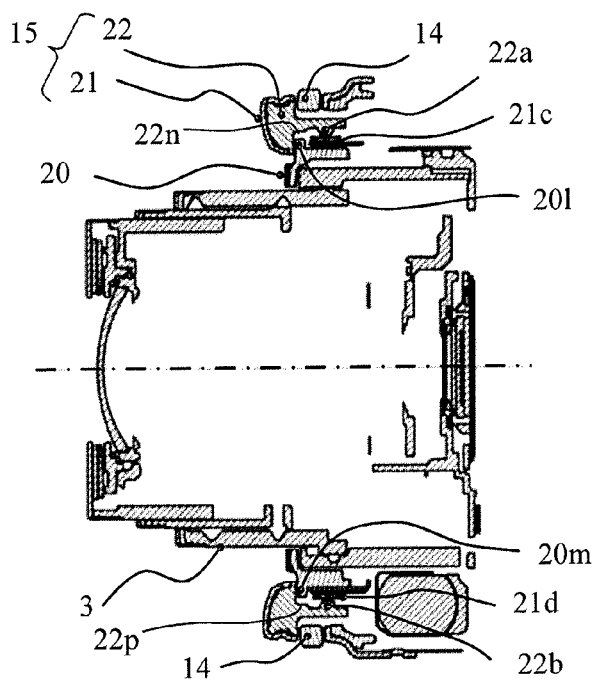
Figure 10C:
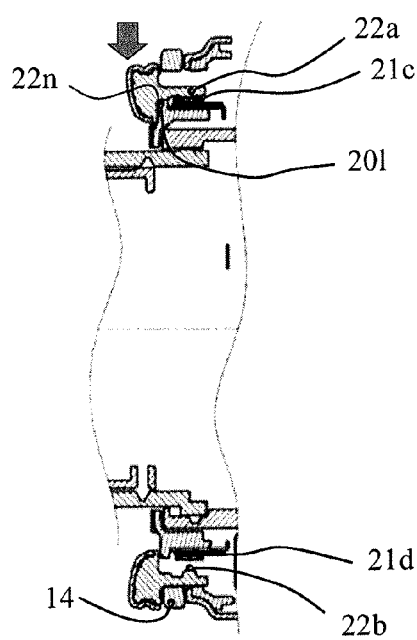
Figure 10D:
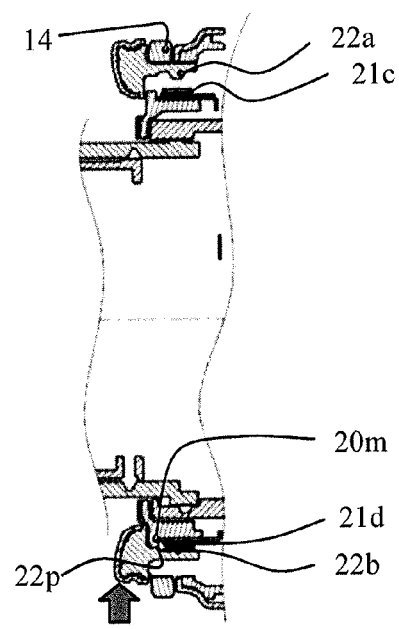

FIG. 10A is a front perspective view illustrating only the lens unit 3 and the front cover unit 18. FIG. 10B is a X-X sectional view which includes the optical axis of the lens unit 3 illustrated in FIG. 10A. FIG. 10C illustrates a state where the release ring 15 is pushing down in a direction of an arrow from the state of FIG. 10B and FIG. 10D illustrates a state where the release ring 15 is pushing up in a direction of an arrow from the state of FIG. 10B.

FIG. 10B is a state where the release ring 15 is positioned at the neutral position. The relation of two release switches 21c and 21d, which are metal dome type and are mounted on the front flexible wiring board 21, and the release base 22 is explained.

In the neutral state, the pushing portion 22a of the release base 22 is arranged directly on the release switch 21c. Additionally, the pushing portion 22b of the release base 22 is arranged directly beneath the release switch 21d. This state does not push each release switch and each release switch does not output signal.

As illustrated in FIG. 10C, when photographer pushes the release ring 15 down in a direction of an arrow, a regulatory surface 22n of the release base 22 abuts to a regulatory surface 20l of the front inner 20 and the release ring 15 is not push any more. The pushing down stroke of the release ring 15 (a movement amount of the release ring 15 from the state of FIG. 10B to the state of FIG. 10C) is slightly bigger than a detection stroke of the release switch 21c. Therefore, the pushing portion 22a of the release base 22 is capable of pushing the release switch 21c. When the release ring 15 becomes the state of FIG. 10C, the pushing portion 22b opposed moves a downward direction from the neutral position. A part of the zoom ring 14 is notched so as not to contact with the pushing portion 22b. In the state of FIG. 10C, when a photographer takes off a finger from the release ring 15, the release ring 15 quickly returns to the state of FIG. 10B being the neutral position by the coil spring 32.

As illustrated in FIG. 10D, when photographer pushes the release ring 15 up in a direction of an arrow, a regulatory surface 22p of the release base 22 abuts to a regulatory surface 20m of the front inner 20 and the release ring 15 is not push any more. The pushing up stroke of the release ring 15 (a movement amount of the release ring 15 from the state of FIG. 10B to the state of FIG. 10D) is slightly bigger than a detection stroke of the release switch 21d. When the release ring 15 becomes the state of FIG. 10D, the pushing portion 22a opposed moves an upward direction from the neutral position. A part of the zoom ring 14 is notched so as not to contact with the pushing portion 22a. In the state of FIG. 10D, when a photographer takes off a finger from the release ring 15, the release ring 15 quickly returns to the neutral state by the coil spring 32.

If a metal dome type switch is too pushed more than necessary, there is a problem that the switch is destroyed. The problem generates when violent impact occurs, e.g. a photographer accidentally drops the camera.

However, since the movable range of the release ring 15 is restricted in the configuration of this embodiment, the release switches 21c, 21d are not pushed more than necessary. Even if the release ring 15 moves beyond the movable range of the release ring 15 by deformation of components or the like, a protruding portion protruding from the release base 22 elastically deforms so that the release switches 21c, 21d are not too took a load.

Next, arrangements of the coil spring 32 for returning the release ring 15 to the neutral position is explained by using FIG. 11.

Figure 11A:
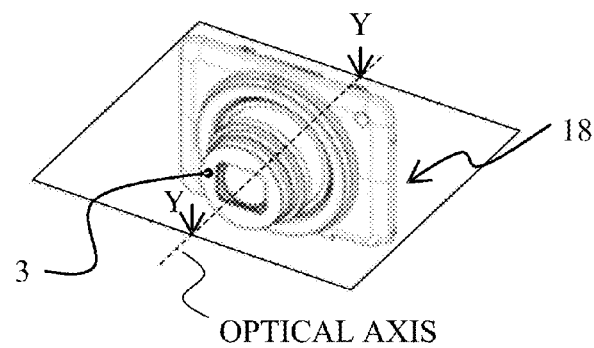
FIGS. 11A and 11B are explanatory diagrams illustrating a structure of an urging member that returns the first ring operation member of the digital camera to a neutral position.
Figure 11B:
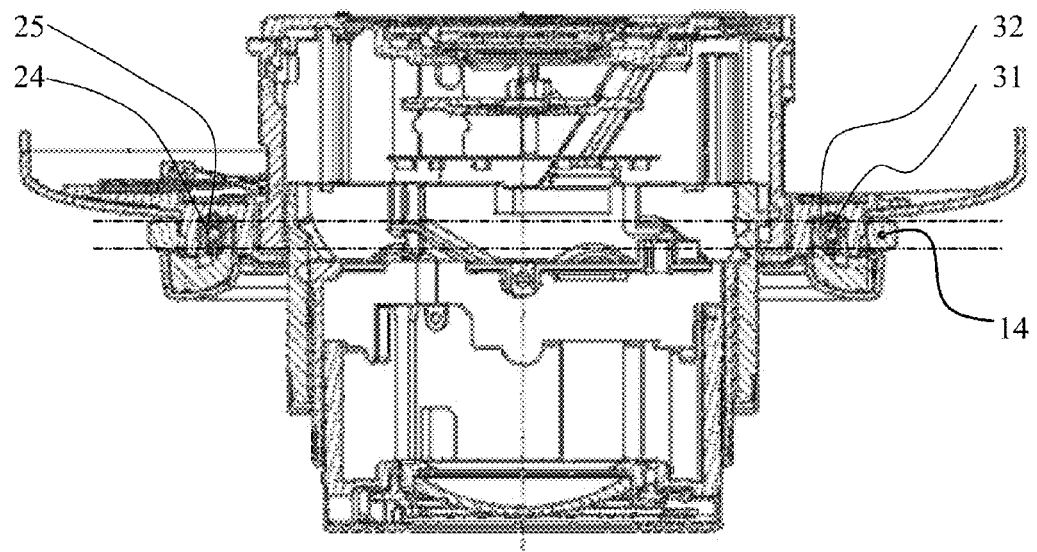

FIG. 11A is a front perspective views illustrated only the lens unit 3 and the front cover unit 18. FIG. 11B is a Y-Y sectional view which includes the optical axis of the lens unit 3 illustrated in FIG. 11A.

Two metal shafts 31 and two coiled springs 32 are arranged one by one on each side of the front inner 20 so as to hold the optical axis of the lens unit 3. The coil springs 32 return the release ring 15 to the neutral position, and one coil spring is also capable of achieving the function that returns the release ring 15 to the neutral position. However, when either of left and right coil springs 32 is arranged, the rattle at the neutral position of the release ring 15 increases and the standard of quality degrades. In view of such a problem, two coil springs 32 are well-balanced arranged on each side of the front inner 20.

Additionally, the coil spring 32 is arranged so as to improve space efficiency and overlap with the thickness of the zoom ring 14 (a range illustrated by the two-dot chain line).

Figure 12A:
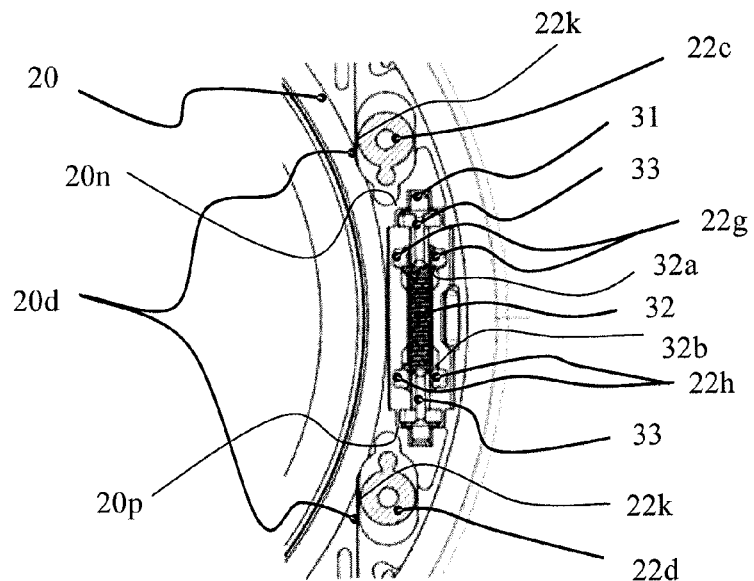
FIGS. 12A to 12C are explanatory diagrams illustrating a structure of an urging member that returns the second ring operation member of the digital camera to a neutral position.
Figure 12B:
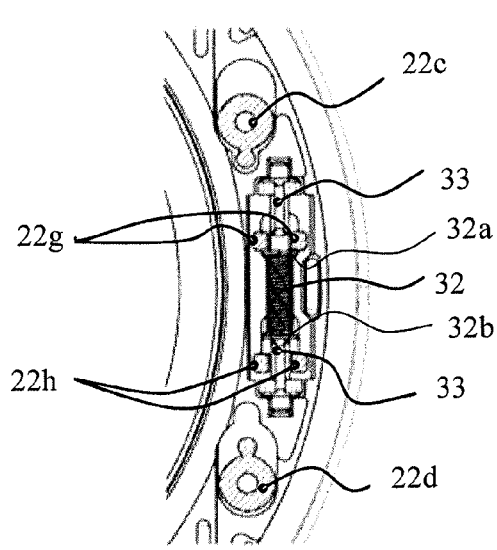
Figure 12C:
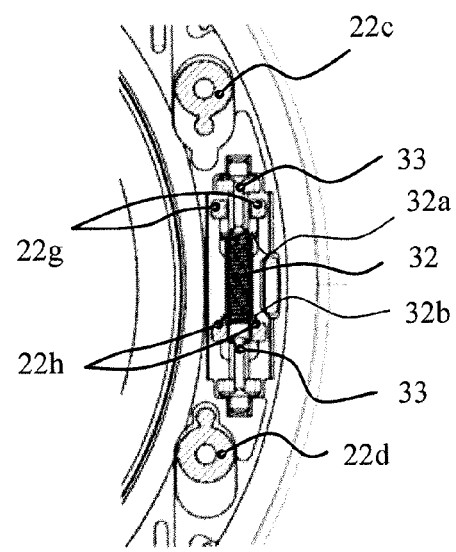

Next, the support configuration of the release ring 15 is explained by using FIGS. 12A to 12C.

FIG. 12A is a sectional view when the release ring 15 is positioned at the neutral position, FIG. 12B is a sectional view when the release ring 15 is pushed down and FIG. 12C is a sectional view when the release ring 15 is pushed up.

In the state of FIG. 12A, each retainer 33 is respectively pushed against a receiving surface of the front inner 20 by urging force of the coil spring 32.

In the state of FIG. 12B, the upper side turn end portion 32a of the coil spring 32 is pushed down by the corner rib portion 22g for spring hooking of the release base 22. Meanwhile the lower side turn end portion 32b is restricted by the retainer 33 arranged at the lower side and the coil spring 32 is irremovable in a downward direction.

Therefore, the coil spring 32 is compressed from the state of FIG. 12A and is charged. In the state where the release ring 15 is pushed down, the corner rib 22h and the screw bosses 22c and 22d of the release base 22 also moves in a downward direction. They are designed so as not to contact with surrounding components. From this state, when the photographer stops the pushing down of the release ring 15, the release ring 15 quickly returns to the neutral position by urging force of the coil spring 32.

In the state of FIG. 12C, the lower side turn end portion 32b is pushed up by the corner rib portion 22h for spring hooking of the release base 22. Meanwhile, the upper side turn end portion 32a is restricted by the retainer 33 arranged at the upper side and the coil spring 32 is irremovable in an upward direction.

Therefore, the coil spring 32 is compressed from the state of FIG. 12A and is charged. In the state where the release ring 15 is pushed up, the corner rib 22g and the screw bosses 22c and 22d of the release base 22 also moves in an upward direction. They are designed so as not to contact with surrounding components similarly as in the case of pushing the release ring 15 down. From this state, when the photographer stops the pushing up of the release ring 15, the release ring 15 quickly returns to the neutral position by urging force of the coil spring 32.

In the neutral position of FIG. 12A, a distance between the corner rib 22g and the corner rib 22h of the release base 22 is the same length with a distance between two retainers 33 arranged above and below the spring unit 30. By the above configuration, the corner rib 22g of the release base 22 and the upper side retainer 33 contact with the upper side turn end portion 32a of the coil spring 32 at the same time. Similarly, the corner rib 22h of the release base 22 and the lower side retainer 33 contact with the lower side turn end portion 32b of the coil spring 32 at the same time. When the distance between the corner rib 22g and the corner rib 22h is different from the distance between two retainers 33, a size difference becomes stop rattle at the neutral position of the release base 22. When a size difference is generated by production error, the position of the retainer 33 is adjustable by interposing a spacer such as a washer between the retainer 33 and front inner receiving surfaces 20n, 20p.

Although only one side of two coil springs 32 arranged at the right and left side was explained, the other side is configured similarly.

Figure 13:
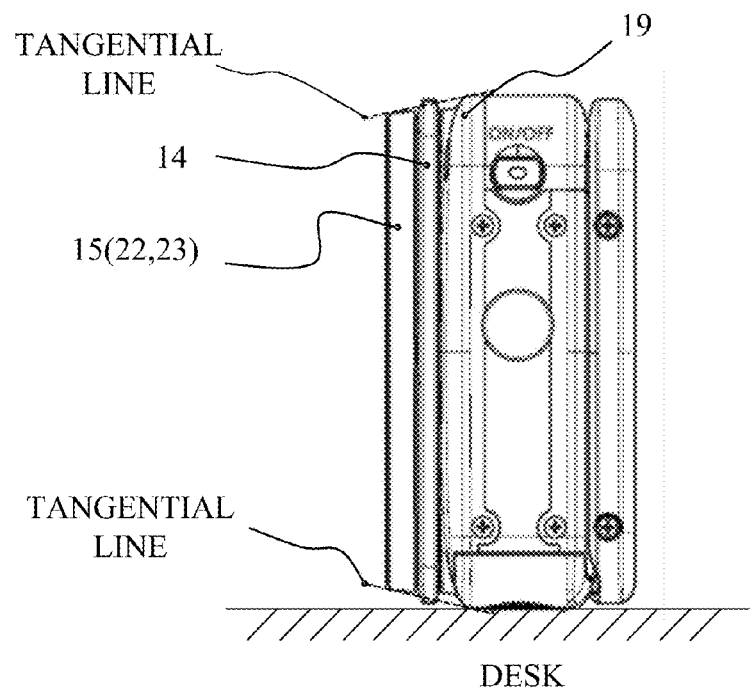
FIG. 13 is a side view of the digital camera.

Next, the position relationship of the zoom ring 14 and the release ring 15 is explained by using FIG. 13.

FIG. 13 is a right side view of the camera, the lens unit 3 is collapsed, and the release ring 15 is the state positioned at the neutral position.

As illustrated in FIG. 13, a line tangent to external shapes of the camera body 1 and the release ring 15 (a tangential line) is drawn, the top side operation portion 14a and the bottom side operation portion 14b of the zoom ring 14 are provided so as to protrude from the tangential line. Photographer operates the top side operation portion 14a and the bottom side operation portion 14b on finger pads so as to rotate. If the upper side operation portion 14a and the bottom side operation portion 14b of the zoom ring 14 don't protrude from the tangential line, the zoom ring 14 is difficult to operate.

When the top side operation portion 14a and the bottom side operation portion 14b of the zoom ring 14 protrude too much, in the case of putting the camera on the desk as illustrated, there is a problem that the bottom side operation portion 14b contacts with the desk and the zoom ring 14 moves carelessly. Additionally, when the top side operation portion 14a and the bottom side operation portion 14b of the zoom ring 14 are protrude too much, in the case of attaching the camera body to a tripod, the bottom side operation portion 14b contacts with an attachment surface of the tripod and the zoom ring is not capable of rotating. By considering this, in this embodiment, the top side operation portion 14a and the bottom side operation portion 14b of the zoom ring 14 are protruded from the tangential line connected the camera body 1 with the release ring 15. Additionally, the top side operation portion 14a and the bottom side operation portion 14b of the zoom ring 14 is configured not to protrude from extension surfaces of the top surface and the bottom surface of the camera body 1.

Figure 14:
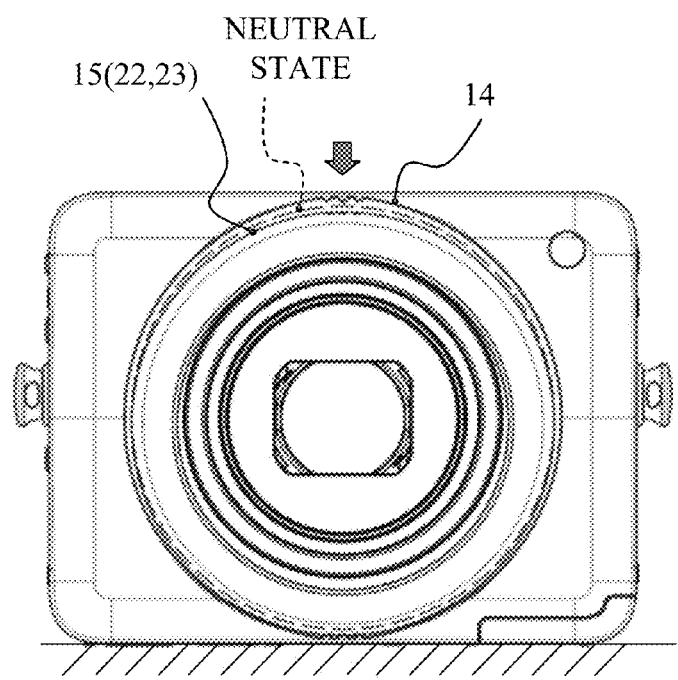
FIG. 14 is a front view of the digital camera.

Next, the position relationship of exterior shapes of the zoom ring 14 and the release ring 15 is explained by using FIG. 14.

FIG. 14 is a front view of the camera. The zoom ring 14 is the neutral state and the release ring 15 is pushed down from the upper direction (a direction of an arrow). A broken line in figure indicates a position of the neutral state of the release ring 15.

The external diameter of the release ring 15 pushed down is not protruded from the outside diameter of the zoom ring 14. Therefore, even if the release ring 15 is pushed down, the bottom end of the release ring 15 does not protrude from the zoom ring 14. If the bottom end of the release ring 15 protrudes from the zoom ring 14 when the release ring 15 is pushed down, the release ring 15 is capable of being applied a force so as to separate from the camera by hooking a finger to the protruding portion of the release ring 15. Additionally, if the bottom end of the release ring 15 protrudes from the zoom ring 14 when the release ring 15 is pushed down, the release ring 15 is fully not capable of operating in the case of putting the camera body 1 on the desk and attaching the tripod. By considering this, in this embodiment, the movement range of the release 15 is configured so that the top end or the bottom end of the release ring 15 is not protruded from the outside diameter of the zoom ring 14 if the release ring 15 is operated to slide.

As explained above, in this embodiment, zooming and release operation are smoothly performable without arranging a plurality of release buttons in a digital camera by arranging the zoom ring 14 and the release ring 15 around the lens unit 3 even if various holding method of the camera is performed.

Additionally, since the zoom ring 14 and the release ring 15 are arranged at approximately center position of the front of the camera body 1, zooming and release operation are easily performable whether photographer operates with right-handed and left hand-handed.

Moreover, by arranging the zoom ring 14 so as to be adjacent to the release ring 15, a serious of actions of performing release operation after deciding an angle of view by performing zooming is smoothly performable.

In this embodiment, although the zoom ring 14 is rotatably operated in a predetermined range, the present invention is not limited thereto. When there is no rotation regulation of zoom ring 14, an urging member so as to return to the neutral position is unnecessary. Then, the rotation is detected by using a PI (a photo interrupter) and hall elements and existence of rotation and a rotational direction are detected by a pulse count system.

Additionally, although the release ring 15 is slidable in the upper and lower direction, the present invention is not limited thereto and the release ring 15 may be slidable in the right and left direction and the other direction.

Moreover, in this embodiment, although the release ring 15 is arranged forward the zoom ring 14, the zoom ring 14 may be arranged forward the release ring 15.

Embodiment 2

Figure 15:
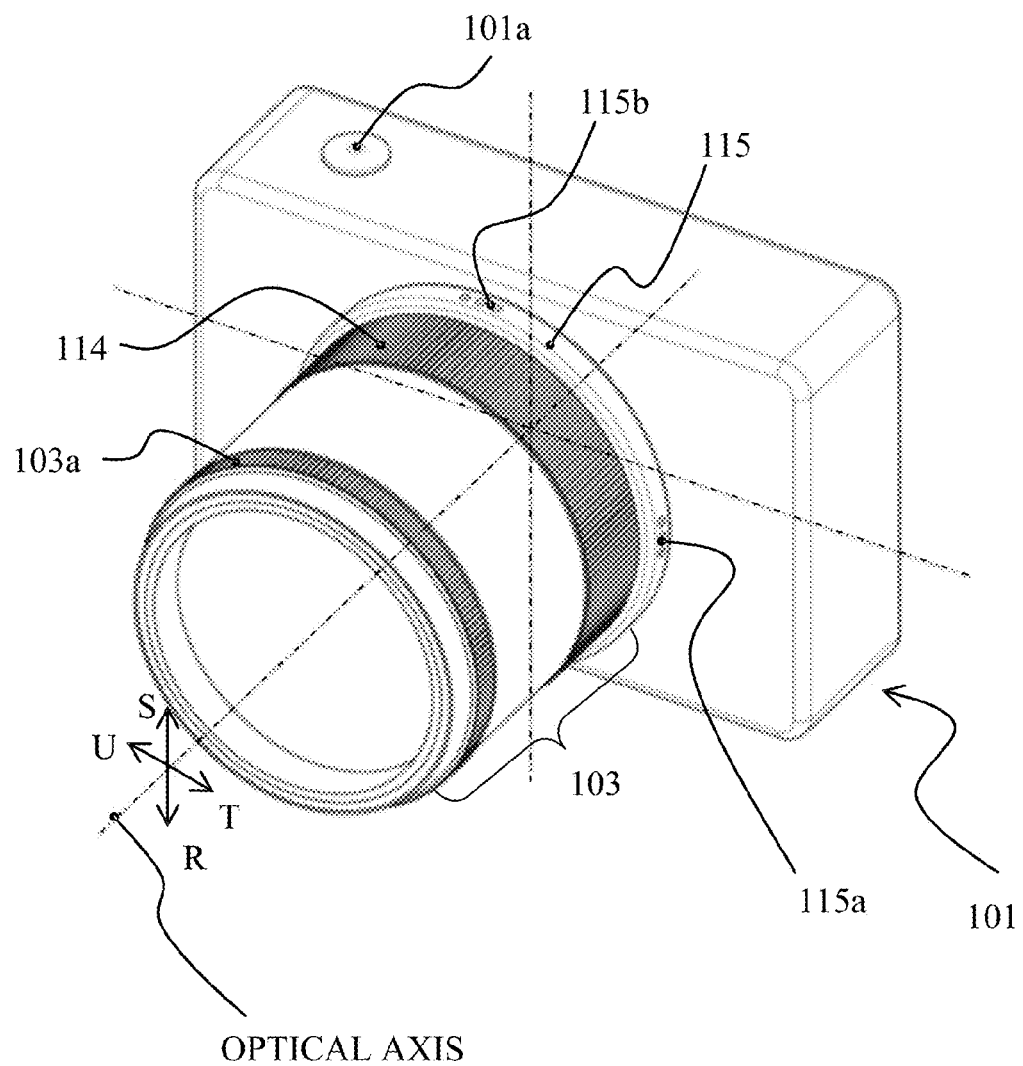
FIG. 15 is a perspective view of a digital camera relating to a second embodiment of the present invention.

FIG. 15 is an appearance perspective view of the digital camera (hereinafter referred to "a camera") which is an electronic apparatus relating to a second embodiment of the present invention.

A release button 101a is arranged on a top surface of the camera body 101.

An interchangeable lens 103 is removably attached to the camera body 101 by using the bayonet detachable mechanism. The interchangeable lens 103 includes a plurality of optical lens, a focus ring 103a, and a detector which detects movements of various rings. The interchangeable lens 103 is capable of transmitting output signal to the camera body 101 through an electrical contact. Additionally, a zoom ring (a second ring operation member) 114 and a multi operation ring (a first ring operation unit) 115 are attached to a base member (not shown) which is a component part of the interchangeable lens 103.

The zoom ring 114 is rotatable relative to the base plate and the multi operation ring 115 is slidable relative to the base plate in a direction perpendicular to an optical axis, i.e. "R(down)", "S(up)", "T(left)" and "U(right)" directions.

A photographing angle of view is changeable by operating the zoom ring 114. A movement of AF (autofocus) frame in a photographing mode, a scroll of reproduction images in a reproduction mode, and a cursor movement in vertical and horizontal directions in various menu modes are performable by operating the multi operation ring 115. These operations are capable of changing assignments of various commands according to liking, for example, in the photographing mode, operating in the "T" direction and operating in the "R" direction are respectively settable so as to perform a single photographing and perform a continuous photographing. Of course, it is also possible to use press of all directions of the multi operation ring 115 as a release button, i.e., it is possible to assign all directions of R, S, T and U directions of the multi operation ring 115 to a single photographing.

Additionally, it is possible to change photographing conditions without shifting the camera in the photographing mode by providing the zoom ring 114 and the multi operation ring 115. Further, a photographer is capable of shooting in a free style by assigning the multi operation ring 115 to a release button function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285996, filed on Dec. 27, 2012, which is hereby incorporated by reference herein in its entirety.

What is claimed is:

1. An image pickup apparatus comprising:
a lens barrel unit;
a first ring operation unit that is ring shaped and arranged so as to surround a periphery of the lens barrel unit;
a base unit configured to hold the first ring operation unit so that the first ring operation unit is capable of moving linearly in a first direction and a second direction perpendicular to an optical axis of the lens unit; and
a first detector configured to detect a linear movement of the first ring operation unit in the first direction or the second direction,
wherein the first ring operation unit is arranged so that a user of the image pickup apparatus can manually operate the first ring operation unit linearly in the first direction or the second direction, and
wherein the first direction and the second direction are opposite to each other.

2. The image pickup apparatus according to claim 1,
wherein the first detector include a first switch which turns on in a case where the first ring operation unit slides in the first direction and a second switch which turns on in a case where the first ring operation unit slides in the second direction, and
wherein the first switch and the second switch are arranged so as to face each other.

3. The image pickup apparatus according to claim 1,
wherein release operation to capture an image is performed in a case where the first detector detects the linear movement of the first ring operation unit.

4. The image pickup apparatus according to claim 1, further comprising:
a second ring operation unit that is ring shaped and arranged so as to surround a periphery of the lens barrel unit, wherein the second ring operation unit is held by the base unit so as to rotate around the optical axis of the lens barrel unit; and
a second detector configured to detect a rotation of the second ring operation unit around the optical axis,
wherein the second ring operation unit is arranged so that a user of the image pickup apparatus can manually operate the second ring operation unit rotatively around the optical axis.

5. The image pickup apparatus according to claim 4,
wherein zooming operation is performed in a case where the second detector detects the rotation of the second ring operation unit.

6. The image pickup apparatus according to claim 4,
wherein the first ring operation unit is arranged forward the second ring operation unit on the optical axis of the lens barrel unit.

7. The image pickup apparatus according to claim 6,
wherein an outside diameter of the first ring operation unit is smaller than an outside diameter of the second ring operation unit.

8. The image pickup apparatus according to claim 7,
wherein a movement range of the first ring operation unit does not protrude from the outside diameter of the second ring operation unit in a direction perpendicular to the optical axis.

9. The image pickup apparatus according to claim 4,
wherein the first detector and the second detector are arranged so as not to overlap each other in an optical axis direction of the lens barrel unit.

10. The image pickup apparatus according to claim 4, further comprising:
a first urging member configured to return the first ring operation unit to a neutral position; and
a second urging member configured to return the second ring operation unit to a neutral position,
wherein the first urging member and the second urging member are arranged so as not to overlap each other in an optical axis direction of the lens barrel unit.

11. The image pickup apparatus according to claim 10,
wherein the first detector and the first urging member are arranged so as not to overlap each other in the optical axis direction of the lens barrel unit, and
wherein the second detector and the second urging member are arranged so as not to overlap each other in the optical axis direction of the lens barrel unit.

12. The image pickup apparatus according to claim 1,
wherein the lens barrel unit is arranged so that a center of the optical axis of the lens barrel unit is overlapped with a center of horizontal and vertical directions of a front of the image pickup apparatus.

13. The image pickup apparatus according to claim 1,
wherein the image pickup apparatus includes an apparatus body and a display unit rotating relative to the apparatus body.

14. An image pickup apparatus comprising:
a lens barrel unit;
a first ring operation unit that is ring shaped and arranged so as to surround a periphery of the lens barrel unit;
a second ring operation unit that is ring shaped and arranged so as to surround a periphery of the lens barrel unit;
a base unit configured to hold the first ring operation unit so that the first ring operation unit is capable of moving linearly in a direction perpendicular to an optical axis of the lens barrel unit, and to hold the second ring operation unit so that the second ring operation unit is capable of rotating around the optical axis of the lens barrel unit;
a first detection unit configured to detect a linear movement of the first ring operation unit; and
a second detection unit configured to detect a rotation of the second ring operation unit,
wherein the first ring operation unit is arranged so that a user of the image pickup apparatus can manually operate the first ring operation unit linearly in the direction perpendicular to the optical axis,
wherein the second ring operation unit is arranged so that a user of the image pickup apparatus can manually operate the second ring operation unit rotatively around the optical axis.

15. The image pickup apparatus according to claim 14,
wherein the first ring operation unit is arranged forward the second ring operation unit on the optical axis of the lens barrel unit.

16. The image pickup apparatus according to claim 14,
wherein an outside diameter of the first ring operation unit is smaller than an outside diameter of the second ring operation unit.

17. The image pickup apparatus according to claim 16,
wherein a linear movement range of the first ring operation unit does not protrude from the outside diameter of the second ring operation unit in the direction perpendicular to the optical axis.

18. The image pickup apparatus according to claim 14,
wherein release operation to capture an image is performed by operating the first ring operation unit so as to move linearly, and
wherein zooming operation is performed by operating the second ring operation unit so as to rotate.

19. The image pickup apparatus according to claim 14,
wherein the first detection unit and the second detection unit are arranged so as not to overlap each other in an optical axis direction of the lens barrel unit.

20. The image pickup apparatus according to claim 14, further comprising:
a first urging member configured to return the first ring operation unit to a neutral position; and
a second urging member configured to return the second ring operation unit to a neutral position,
wherein the first urging member and the second urging member are arranged so as not to overlap each other in an optical axis direction of the lens barrel unit.

21. The image pickup apparatus according to claim 20,
wherein the first detection unit and the first urging member are arranged so as not to overlap each other in the optical axis direction of the lens barrel unit, and
wherein the second detection unit and the second urging member are arranged so as not to overlap each other in the optical axis direction of the lens barrel unit.

22. The image pickup apparatus according to claim 14,
wherein the lens barrel unit is arranged so that a center of the optical axis of the lens barrel unit is overlapped with a center of horizontal and vertical directions of a front of the image pickup apparatus.

23. The image pickup apparatus according to claim 14, wherein the image pickup apparatus includes an apparatus body and a display unit rotating relative to the apparatus body.

* * * * *